United States Patent
Seo

(10) Patent No.: US 6,862,145 B2
(45) Date of Patent: Mar. 1, 2005

(54) POSITIONING MECHANISM AND POSITIONING MECHANISM FOR FILM SCANNER

(75) Inventor: Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/647,388

(22) Filed: Aug. 26, 2003

(65) Prior Publication Data

US 2004/0040410 A1 Mar. 4, 2004

(30) Foreign Application Priority Data

Aug. 30, 2002 (JP) ........................................ 2002-252987

(51) Int. Cl.⁷ .............................................. G02B 15/14
(52) U.S. Cl. ...................................... 359/696; 359/699
(58) Field of Search ................................ 359/694, 696, 359/699, 703, 704

(56) References Cited

U.S. PATENT DOCUMENTS

| | | | | |
|---|---|---|---|---|
| 2,995,061 A | * | 8/1961 | Briskin et al. | 396/84 |
| 3,781,098 A | * | 12/1973 | Heiniger et al. | 352/140 |
| 3,897,698 A | * | 8/1975 | Ohsaka | 475/61 |
| 4,137,782 A | * | 2/1979 | Lange | 74/32 |
| 5,950,028 A | * | 9/1999 | Ito | 396/349 |
| 6,318,662 B1 | * | 11/2001 | Hori et al. | 242/374 |
| 6,682,157 B2 | * | 1/2004 | Ito | 312/319.6 |

* cited by examiner

Primary Examiner—Ricky Mack
(74) Attorney, Agent, or Firm—Greenblum & Bernstein, P.L.C.

(57) ABSTRACT

A positioning mechanism includes a moving body which can be moved in accordance with a drive force supplied from a drive source, a stopper which defines a movement extremity of the moving body, and a biasing device which engages with the moving body when the moving body is moved to the vicinity of the movement extremity and which converts, after engagement, the force from the moving body into a force to bias the moving body toward the stopper.

8 Claims, 9 Drawing Sheets

POSITIONING MECHANISM AND POSITIONING MECHANISM FOR FILM SCANNER

BACKGROUND OF THE INVENTION

1. Field of the Invention

The present invention relates to a positioning mechanism in which a moving body which moves along a guide rail is stopped precisely at a predetermined position, and a film scanner using the positioning mechanism.

2. Description of the Related Art

In an example of a known positioning mechanism in which a moving body which is moved along a guide rail is stopped precisely at a predetermined stop position, the moving body and a motor (drive source) are associated with each other via a drive mechanism, so that the moving body can be stopped at a predetermined stop position by controlling the rotation of the motor.

However, in order to correctly stop the moving body at a predetermined stop position by the control of the rotation of the motor, it is necessary to precisely control the rotation of the motor. Failure to precisely control the rotation of the motor makes it impossible to stop the moving body correctly at the stop position.

SUMMARY OF THE INVENTION

The present invention provides a simple positioning mechanism in which a moving body can be stopped exactly at a desired position without need for precise control of the operation of a drive source.

The present invention also provides a film scanner using the positioning mechanism.

According to an aspect of the present invention, a positioning mechanism is provided, including a moving body which moves by receiving a drive force supplied from a drive source, a stopper which defines a movement extremity of the moving body, and a biasing device for engaging with the moving body when the moving body is moved to the vicinity of the movement extremity, and upon engagement with the moving body, for converting the force from the moving body into a force to bias the moving body toward the stopper to thereby bias the moving body toward the stopper.

The biasing device can include a toothed cam which engages with a rack provided on the moving body when the moving body is moved to the vicinity of a movement extremity of the moving body, the toothed cam being rotatably supported at a predetermined position, and a biasing member which is in elastic contact with the toothed cam, the toothed cam being biased by the biasing member to rotate in a direction so that the moving body abuts against the stopper when the moving body is moved to the vicinity of the movement extremity so that the toothed cam begins engaging with the rack.

In another embodiment, a positioning mechanism is provided, including a driving body which moves by receiving a drive force supplied from a drive source, a driven body which receives the moving force from the driving body and moves in the same direction as the driving body, a stopper which defines a movement extremity of the driven body, and a biasing device for converting the moving force from the driving body after the driven body abuts against the stopper, into a force to bias the driven body toward the stopper to thereby bias the driven body.

The biasing device includes a compression spring which is provided between the driving body and the driven body and which is compressed when the driving body is moved to thereby transmit the movement of the driving body to the driven body.

In another embodiment, a positioning mechanism is provided for a film scanner having a light source, an illumination optical system which changes a light bundle emitted from the light source to correspond to the size of a film and illuminates a surface of the film, and an image pickup optical system which changes the light bundle transmitted through the film surface to correspond to an area of an image pickup element to be used wherein the light bundle is incident upon the image pickup element, the positioning mechanism including a moving body which holds a movable lens which constitutes a portion of one of the illumination optical system and the image pickup optical system, the moving body being moved by receiving a drive force supplied from a drive source along an optical axis direction of the one of the illumination optical system and the image pickup optical system, a stopper which is in contact with the moving body to define a movement extremity of the moving body, and a biasing device for engaging with the moving body when the moving body is moved to the vicinity of the movement extremity, and upon engagement with the moving body, for converting the force from the moving body into a force to bias the moving body toward the stopper to thereby bias the moving body toward the stopper.

It is desirable for the biasing device to include a toothed cam which engages with a rack provided on the moving body when the moving body is moved to the vicinity of the movement extremity, and which is rotatably supported at a predetermined position and a biasing member which is in elastic contact with the toothed cam, the toothed cam being biased by the biasing member to rotate in a direction to bring the moving body in contact with the stopper when the moving body is moved to the vicinity of the movement extremity so that the toothed cam begins engaging with the rack.

In another embodiment, a positioning mechanism is provided for a film scanner having a light source, an illumination optical system which changes the width of light bundle emitted from the light source to correspond to the size of a film and illuminates a surface of the film, and an image pickup optical system which changes the light bundle transmitted through the film surface to correspond to an area of an image pickup element to be used wherein the light bundle is incident upon the image pickup element, the positioning mechanism including a driving body moves by receiving a drive force supplied from a drive source, along an optical axis of one of the illumination optical system and the image pickup optical system, a driven body which receives the moving force from the driving body and moves in the same direction as the driving body, the driven body supporting a movable lens which constitutes a portion of the one of the illumination optical system and the image pickup optical system, a stopper which defines a movement extremity of the driven body, and a biasing device for converting the moving force from the driving body, after the driven body abuts against the stopper, into a force to bias the driven body toward the stopper to thereby bias the driven body.

It is desirable for the biasing device to include a compression spring which is provided between the driving body and the driven body and which is compressed when the driving body is moved to thereby transmit the movement of the driving body to the driven body.

The present disclosure relates to subject matter contained in Japanese Patent Application No. 2002-252987 (filed on Aug. 30, 2002) which is expressly incorporated herein by reference in its entirety.

BRIEF DESCRIPTION OF THE DRAWINGS

The invention will be discussed below with reference to the accompanying drawings, in which.

DESCRIPTION OF THE PREFERRED EMBODIMENT

A first embodiment of the present invention will be discussed below with reference to FIGS. 1 through 9.

Figure 1:
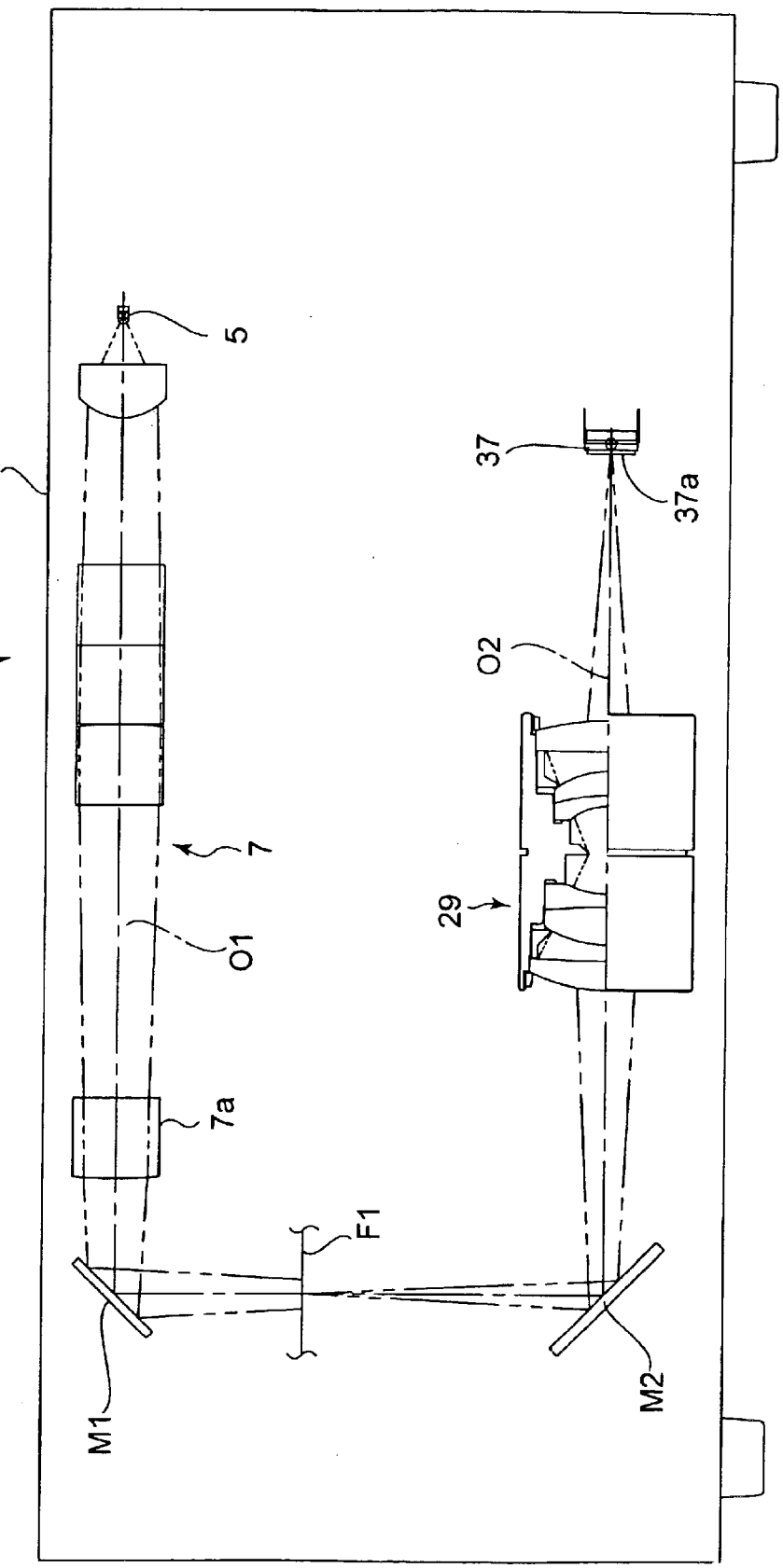
FIG. 1 is longitudinal sectional view of a film scanner which scans a Brownie film, according to an embodiment of the present invention.

As shown in FIG. 1, a film scanner 1 includes a parallelepiped casing 3 which is elongated in the lateral direction, in which a white LED (light source) 5, an illumination optical system 7, a pair of upper and lower mirrors M1 and M2, an first image pickup optical system 29, an RGB 3 line CCD (image pickup element) 37 which is referred to hereinafter as a linear CCD 37, a drive mechanism for the illumination optical system 7 and the first image pickup optical system 29, and a motor M as a drive source for the drive mechanism are provided. The rotating shaft 15, the rotation transmission shaft 19, the gears 21, 23, the gears 17, 25, the upper gear train G1, the lower gear train G2, the motor M, and the pinion P thereof constitute the drive mechanism (see FIG. 4).

The casing 3 is provided, on the front surface thereof, with a film insertion opening (not shown) and a slot (not shown) for a memory card. In the vicinity of the film insertion opening and the memory card slot, ejector buttons (not shown) are provided to eject a film F1 or F2 and a memory card (not shown), inserted in the film insertion opening and the memory card slot, respectively. A Brownie film F1 and a 35 mm film F2 can be selectively inserted in the film insertion opening. In the casing 3, a film discrimination sensor (not shown) which discriminates the films F1 and F2, and a film feeder (not shown) which moves the film F1 or F2 in the right hand direction in FIG. 1 intermittently by a displacement corresponding to a line pitch of the linear CCD 37 are provided. The film discrimination sensor and the film feeder are connected to a CPU (not shown).

Figure 2:
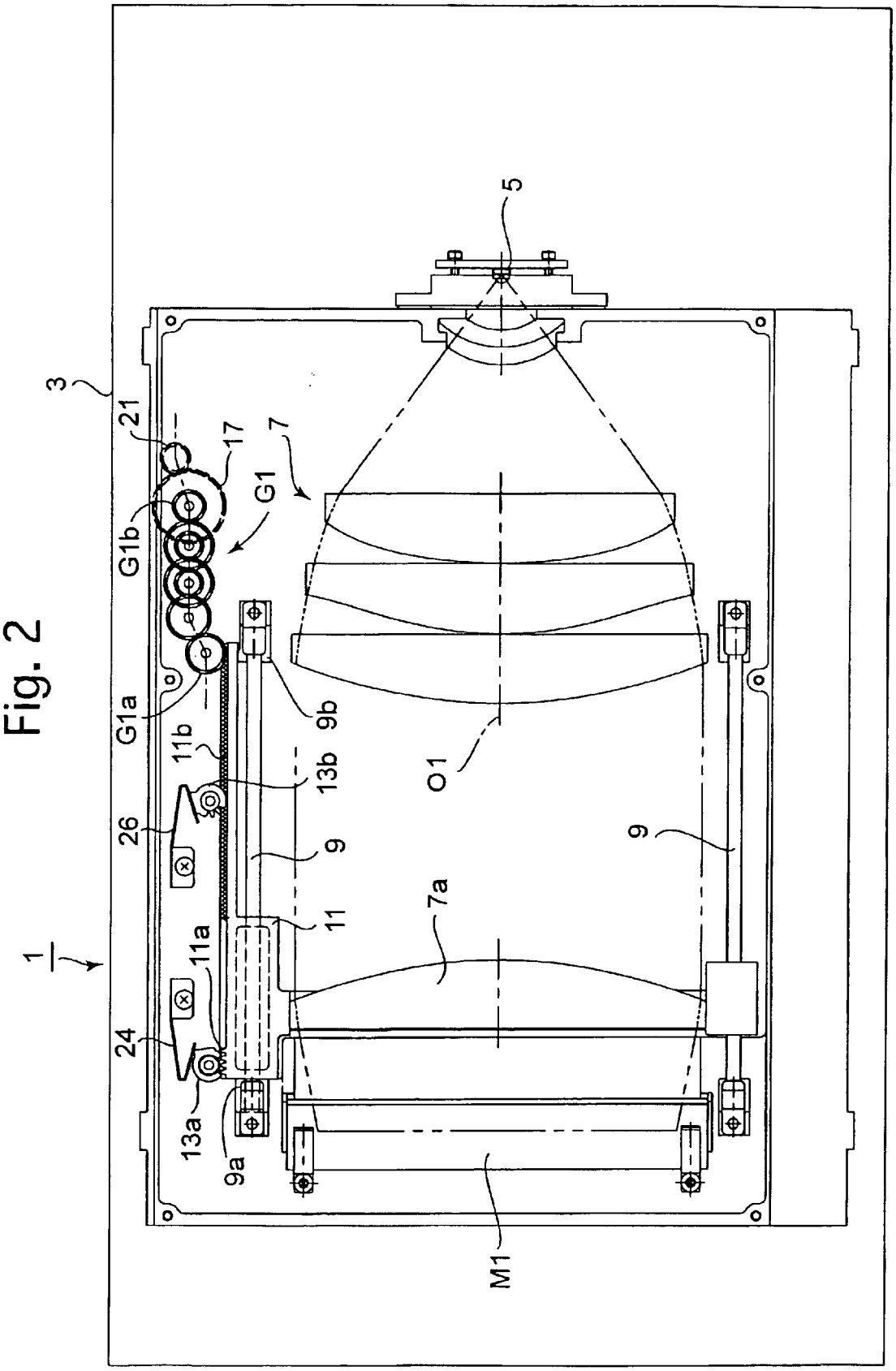
FIG. 2 is a plan view of an internal structure of a film scanner shown in FIG. 1, which scans a Brownie film.
Figure 8:
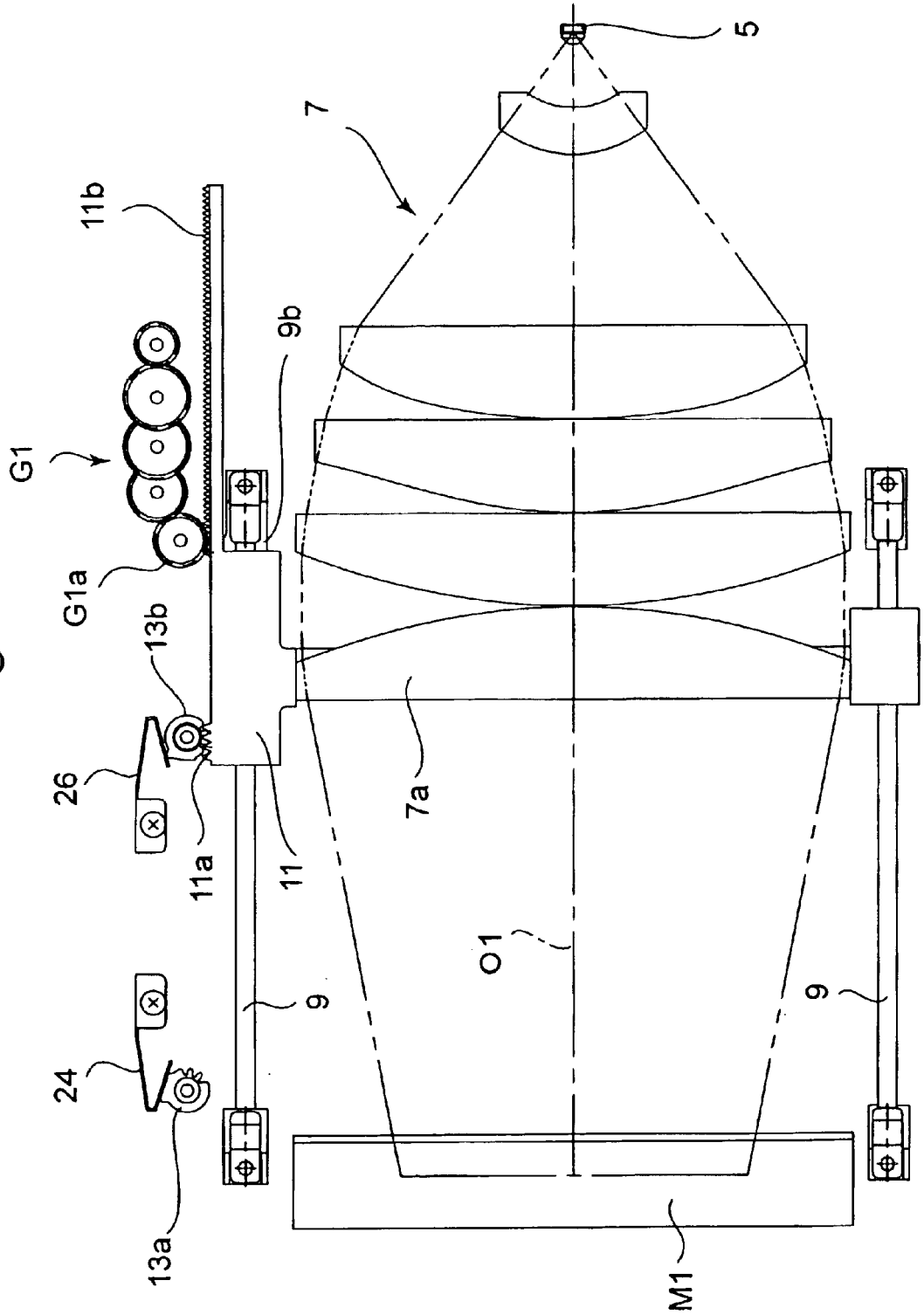
FIG. 8 is a side elevational view of an internal structure of a film scanner when a 35 mm film is scanned, according to an embodiment of the present invention.

The white LED 5 is located in the casing 3 at the upper corner thereof and emits light from the front surface of the LED. The illumination optical system 7 which receives the light emitted from the white LED 5 is made of a plurality of lenses. As can be seen in FIGS. 2 and 8, a pair of guide rails 9 are provided on opposite sides of the illumination optical system 7 and extend in a direction parallel with the optical axis O1 of the illumination optical system 7. A lens holder 11 is slidably fitted in the guide rails 9. The lens holder 11 holds a movable lens 7a of the illumination optical system 7. The illumination optical system 7 includes a plurality of lenses of which only the lens 7a is movable in the optical axis direction O1 and the remaining lenses are all stationary.

As shown in FIG. 2, stopper 9a and 9b are provided at the opposite ends of one of the guide rails 9.

Figure 4:
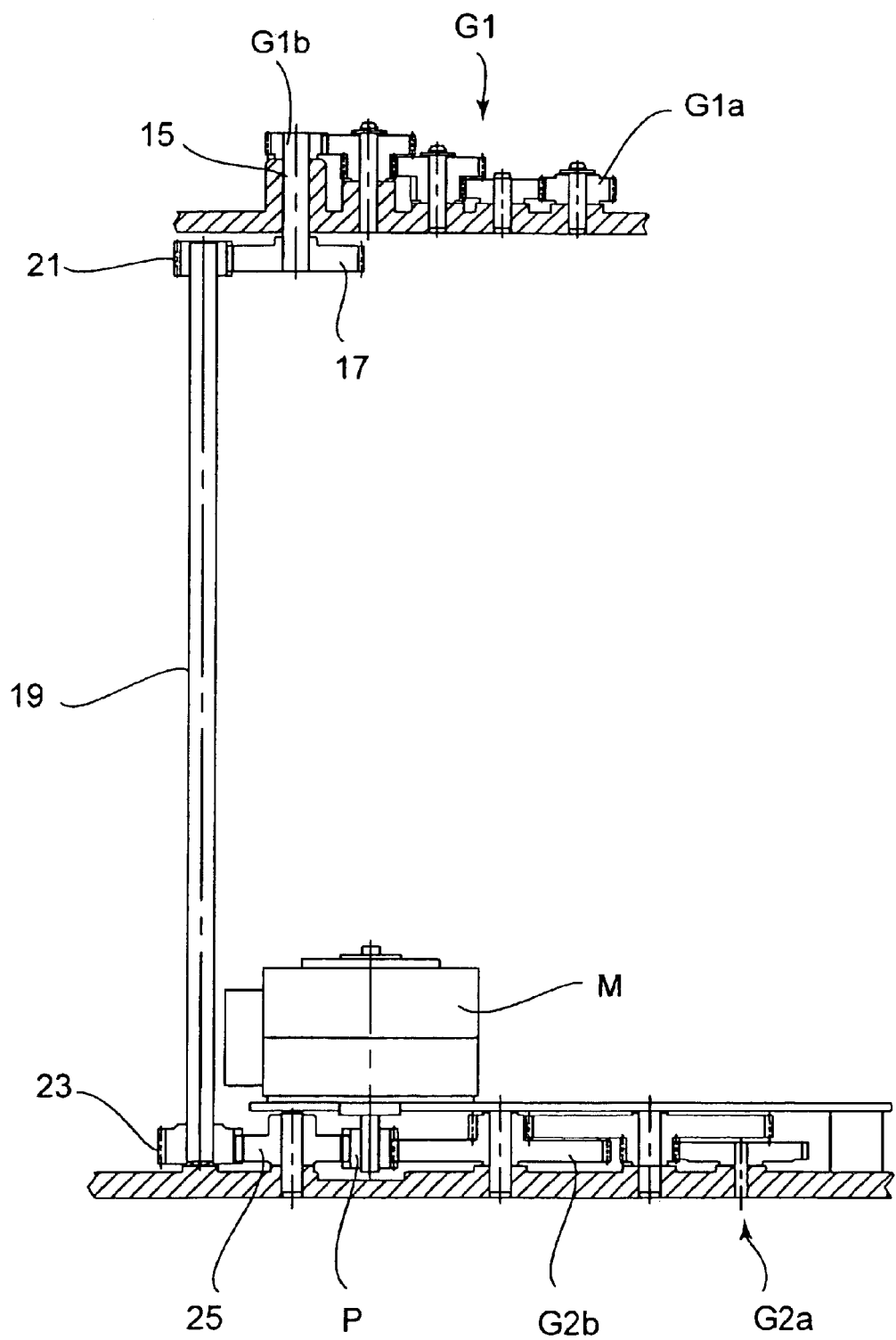
FIG. 4 is a side view of a drive mechanism for an illumination optical system and an image pickup optical system, according to an embodiment of the present invention.

The lens holder (moving body) 11 is provided on the side surface thereof with short and long racks 11a and 11b which extend in the optical axis direction O1. The short rack 11a is disengageably engaged with a cam 13a with a gear (toothed cam which constitutes a biasing device) and a cam 13b with a gear (toothed cam). The long rack 11b is always engaged with a gear G1a which is located at one end of an upper gear train G1 and is disengageably engaged with the toothed cam 13b. As shown in FIG. 4, a gear G1b at the other end of the upper gear train G1 has a rotating shaft 15 to which a gear 17 is secured at the lower end of the shaft. The gear 17 engages with a gear 21 secured to an upper end of a rotation transmission shaft 19 which extends in the upward and downward direction. A gear 23 which is secured to the lower end of the rotation transmission shaft 19 is in mesh with a gear 25 which is in mesh with a pinion P secured to the drive shaft of the motor M. The motor M is connected to the CPU so that the motor M rotates in the forward or reverse direction in accordance with a forward or reverse rotation signal supplied from the CPU. The rotational force is transmitted to the rack 11b through the gears 25, 23, 21, 17 and the upper gear train G1, so that the lens holder 11 (lens 7a) is moved in the optical axis direction O1 to vary the width of the beam of light transmitted through the illumination optical system 7.

Leaf springs (biasing members) 24 and 26 are provided in the vicinity of the toothed cams 13a and 13b, respectively. The leaf springs 24 and 26 are always elastically in contact with the toothed cams 13a and 13b, respectively.

The mirror M1 is provided on the side opposite to the white LED 5, seen from the illumination optical system 7. The second mirror M2 is provided directly below the first mirror M1.

Figure 3:
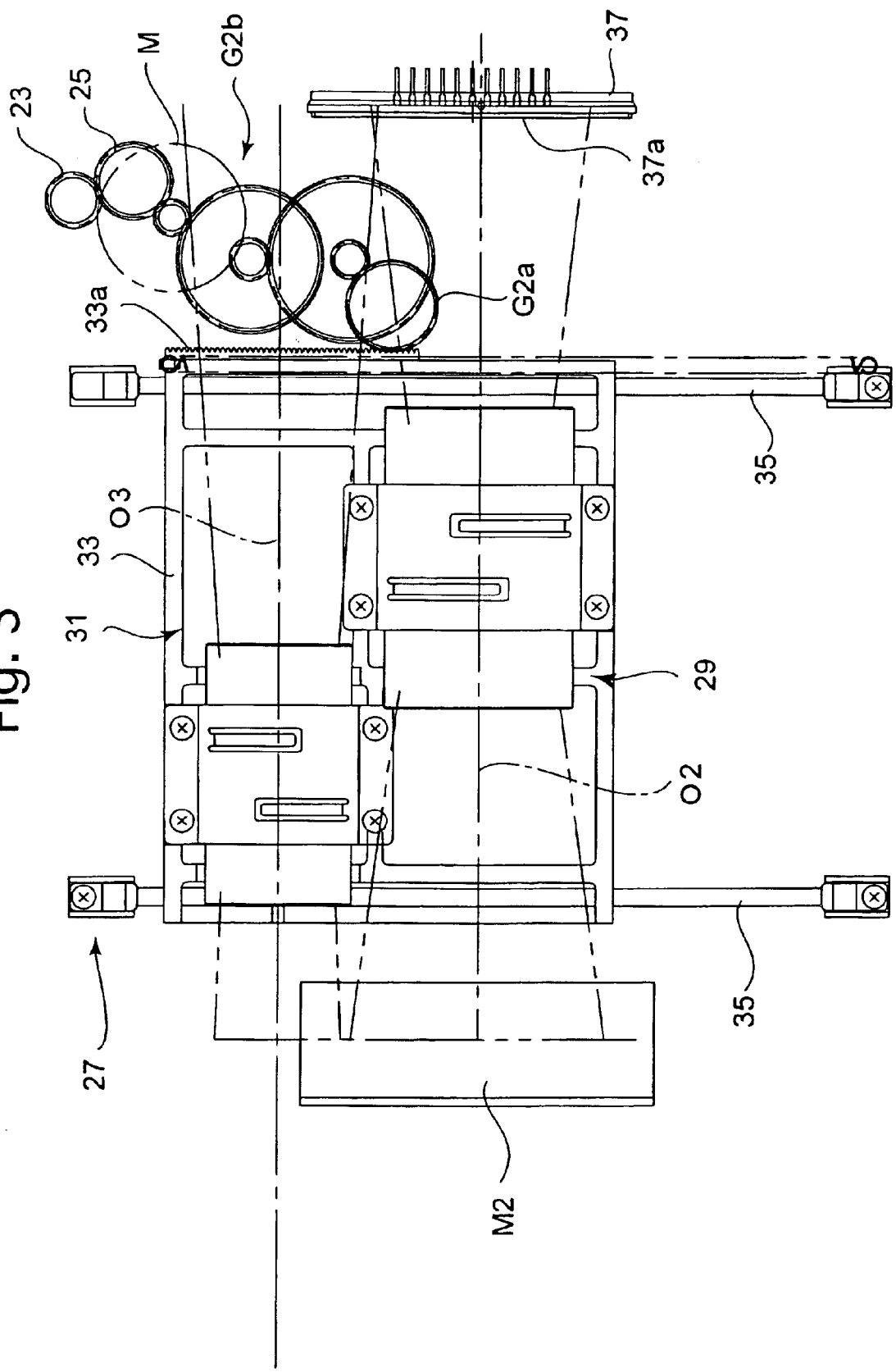
FIG. 3 is a plan view of an image pickup optical system, according to an embodiment of the present invention.

The image pickup optical unit 27 is arranged on the right side of the lower mirror M2 in FIG. 1. The image pickup optical unit 27 includes two image pickup optical systems (a first image pickup optical system 29 and a second image pickup optical system 31) having different focal lengths, as shown in FIG. 3. The first image pickup optical systems 29 and 31 have optical axes O2 and O3 extending in parallel with the optical axis O1. The first and second image pickup optical systems 29 and 31 are held by an image pickup optical system holder 33 which is, in turn, slidably held by a pair of guide rails 35 extending perpendicularly to the optical axes O2 and O3. The image pickup optical system holder 33 is provided with a rack 33a which is always in mesh with a gear G2a located at one end of a lower gear train G2. As shown in FIG. 4, a gear G2b at the other end of the lower gear train G2 is in mesh with the pinion P of the motor M, so that when the motor M is rotated in the forward or reverse direction, the rotational force of the motor M is transmitted to the rack 33a through the gear train G2. Consequently, the first image pickup optical system 29 or the second image pickup optical system 31 is alternately moved between the mirror M2 and the linear CCD 37.

The scanning operation of the film F1 or F2, using the film scanner constructed as above will be discussed below.

A power switch (not shown) is turned ON to cause the white LED 5 to emit light, and a memory card is inserted in the memory card slot.

Figure 5:
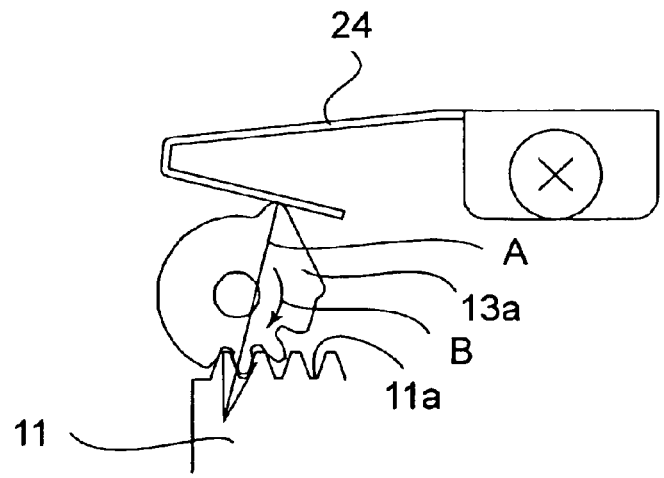
FIG. 5 is an enlarged view of a cam with a gear and a rack in mesh therewith, immediately before a lens holder comes into contact with a stopper, according to an embodiment of the present invention.
Figure 6:
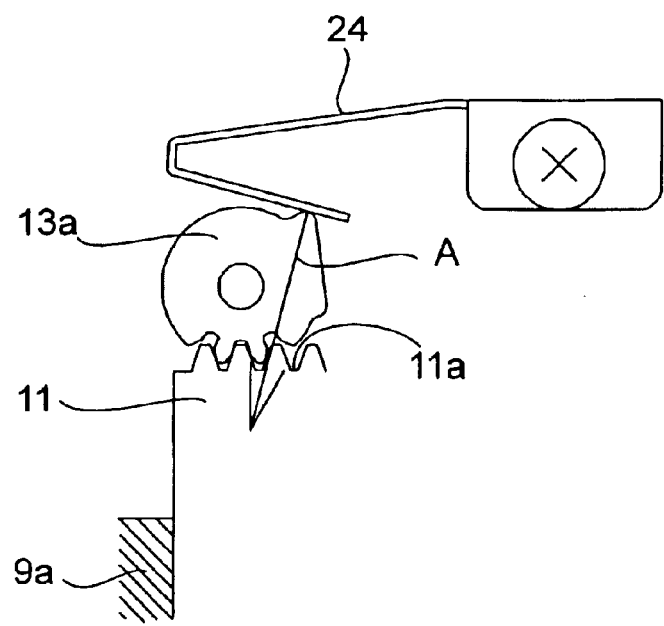
FIG. 6 is an enlarged view of a cam with a gear and a rack in mesh therewith, when a lens holder is in contact with a stopper, according to an embodiment of the present invention.

Thereafter, the Brownie film F1 is inserted in the film insertion opening of the casing 3, as shown in FIG. 1. The film discrimination sensor detects that the inserted film is the Brownie film F1. As a result, the motor M is rotated in the forward direction in response to the forward rotation signal supplied from the CPU to the motor M. The rotation of the motor M is transmitted to the lens holder 11 and the image pickup optical system holder 33 through the upper gear train G1 and the lower gear train G2, etc. Consequently, the lens holder 11 is moved close to the mirror M1. The motor M is controlled so that when the lens holder 11 is stopped immediately before it comes into contact with the stopper 9a. Namely, when the lens holder comes to a position directly before the stopper 9a, the toothed cam 13a and the short rack 11a which have been disengaged from each other (FIG. 9) are engaged with each other (FIG. 5). The toothed cam 13a which now engages with the short rack 11a is rotated in the clockwise direction in FIG. 5, so that the leaf spring 24 is elastically deformed. When the toothed cam 13a reaches a position shown in FIG. 5, the leaf spring 24 presses the toothed cam 13a in the direction "A" due to the elastic restoration of the leaf spring 24. As a result, the toothed cam 13a is biased to rotate in the direction B, so that the lens holder 11 is slightly moved toward the stopper 9a. Consequently, the lens holder 11 comes into contact with the stopper 9a and is stopped.

Due to the rotational force of the motor M transmitted to the image pickup optical system holder 33, the first image pickup optical system 29 is moved to a light path between the mirror M2 and the linear CCD 37. Moreover, an operation signal is supplied from the CPU to the film feeder, so that the Brownie film F1 is moved between the upper and lower mirrors M1 and M2, intermittently at a displacement corresponding to the line pitch of the linear CCD 37.

In this position, as shown in FIG. 1, the light transmitted through the illumination optical system 7 is incident upon the mirror M1 and is reflected thereby downwardly. The reflected light is transmitted through one frame of the Brownie film F1 at a width corresponding to the line pitch, with a coverage slightly larger than the distance between the opposing sides of a photosensitive surface of the Brownie film F1. The light transmitted through the Brownie film F1 is reflected by the mirror M2 and is made incident upon the linear CCD 37 via the first image pickup optical system 29. Consequently, an image whose width corresponds to the line pitch, recorded on the photosensitive surface of the Brownie film F1 is formed on the entire light receiving surface 37a of the linear CCD 37. Thus, each frame is scanned at a width interval corresponding to the line pitch. The film is moved intermittently at a displacement corresponding to the line pitch by the film feeder, so that one frame can be entirely scanned. Thereafter, a subsequent frame is scanned.

The object image formed on the light receiving surface 37a is converted into electrical image data by the linear CCD 37. The image data is recorded in an internal memory through a gain control circuit, an A/D converter, a DSP, a memory controller, and the CPU. The CPU is connected to a card controller, so that the image data is recorded also in the memory card inserted in the memory card slot.

The digital image data processed in the film scanner 1 is converted into analogue data by a D/A converter, so that the analogue image data can be supplied to an external electronic device through a video output terminal.

Figure 7:
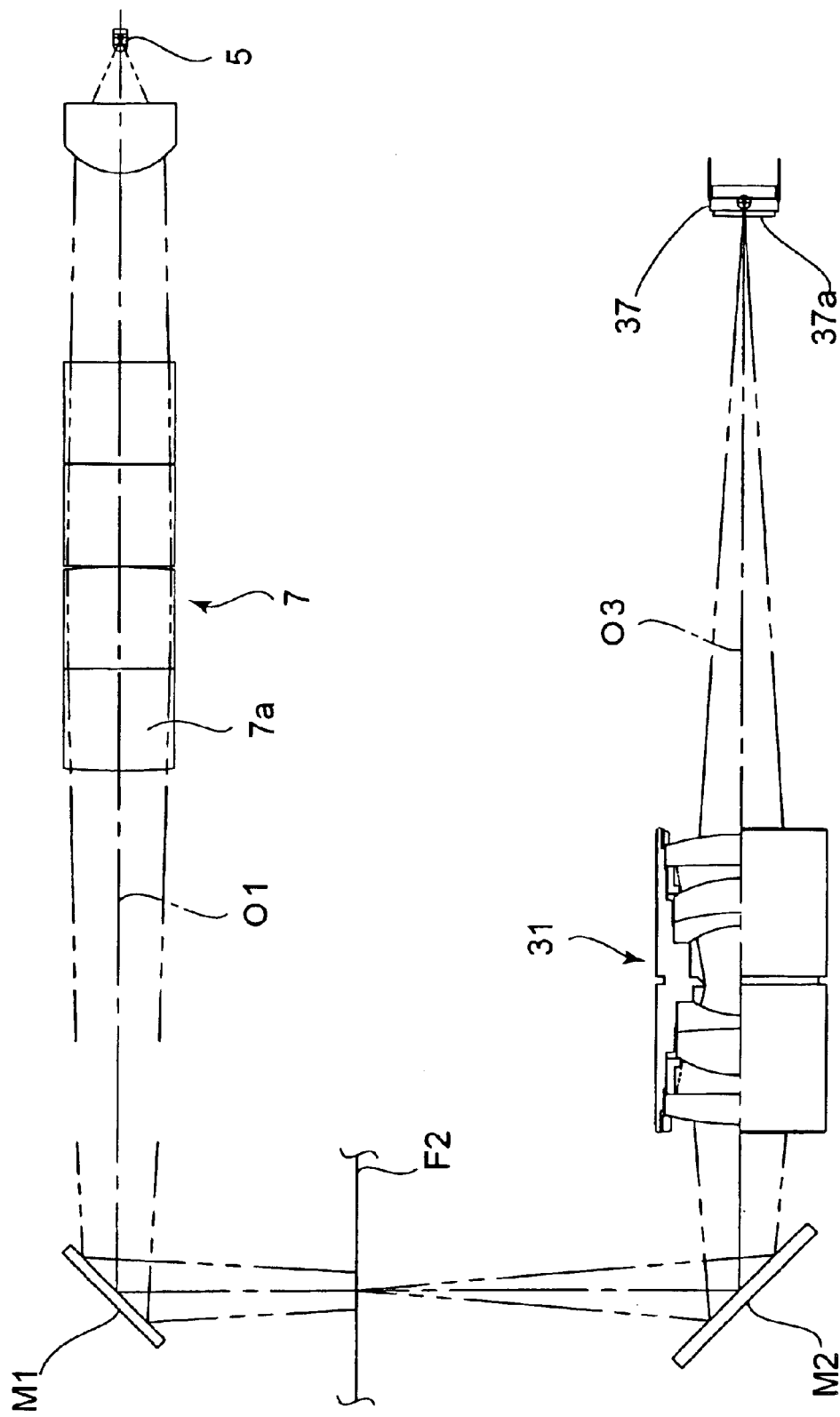
FIG. 7 is a side elevational view of main parts of a film scanner when a 35 mm film is scanned, according to an embodiment of the present invention.

When a 35 mm film F2 is inserted in the film insertion opening, as shown in FIGS. 7 and 8, the film discrimination sensor detects that the inserted film is the 35 mm film F2. Consequently, the CPU sends a reverse rotation signal to the motor M, so that the motor M is rotated in the reverse direction. As a result, the lens holder 11 is moved away from the mirror M1. The motor M is controlled so that the motor is stopped immediately before the lens holder 11 comes into contact with the stopper 9b. When the lens holder 11 is moved to a position directly before the stopper 9b, the leaf spring 26 presses the toothed cam 13b, so that the toothed cam 13b which is in mesh with the short rack 11a is biased to rotate in the counterclockwise direction in FIG. 8. Consequently, the lens holder 11 is slightly moved toward the stopper 9b. When the lens holder 11 comes into contact with the stopper 9b, the movement of the lens holder is stopped. Thus, the positioning of the lens holder is completed (FIG. 8).

Figure 9:
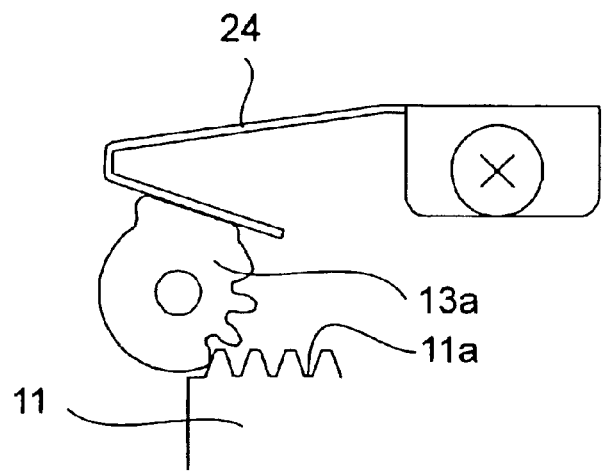
FIG. 9 is an enlarged view of a cam with a gear and a rack when a lens holder is spaced from a stopper, according to an embodiment of the present invention.

Due to the reverse rotation of the motor M transmitted to the rack 33a, the second image pickup optical system 31 is moved in a light path between the mirror M2 and the linear CCD 37. Note that, in this position, the toothed cam 13a is disengaged from the short rack 11a, as shown in FIGS. 8 and 9.

In this position, as shown in FIG. 8, the light transmitted through the illumination optical system 7 is incident upon the mirror M1, wherein the light incident upon the mirror M1 has a width smaller than that in FIG. 2. The light reflected downward by the mirror M1 is transmitted through the 35 mm film F2 at a width corresponding to the line pitch, with a coverage slightly larger than the distance between the opposing sides of a photosensitive surface of the 35 mm film F2. The light transmitted through the 35 mm film F2 is reflected by the mirror M2 and is made incident upon the linear CCD 37 via the second image pickup optical system 31. Consequently, an image of a portion of the 35 mm film F2 corresponding to the line pitch is formed on the entire light receiving surface 37a of the linear CCD 37.

In the illustrated embodiment, when the movable lens 7a is moved to vary the focal length of the illumination optical system 7, the rotation of the motor M is roughly controlled so that the lens holder 11 is stopped directly before coming into contact with the stopper 9a or 9b. Moreover, the moving force of the lens holder 11 is transmitted to the leaf springs 24 and 26 via the toothed cams 13a and 13b, so that the lens holder 11 is biased toward the stopper 9a or 9b and is brought into contact therewith, by the toothed cam 13a or 13b which is biased to rotate by the reaction of the leaf spring 24 or 26. Thus, the lens holder 11 (movable lens 7a) is correctly positioned at a predetermined position.

Therefore, it is not necessary to precisely control the rotation of the motor M.

Since the light can be received by the entirety of the light receiving surface 37a of the linear CCD 37 by selectively using one of the two image pickup optical units 27 (first image pickup optical system 29 and the second image pickup optical system 31), regardless of the kind of the films to be used, i.e., the Brownie film F1 or 35 mm film F2, the linear CCD 37 does not have a non-utilized area. Moreover, the light emitted from the white LED 5 can be transmitted through the film F1 or F2 with a coverage slightly larger than the distance between the opposing sides of the photosensitive surface of the film F1 or F2 by varying the power of the illumination optical system 7 depending on the kind of the film, i.e., the film F1 or the film F2. Therefore, when the 35 mm film is scanned, the amount of light which can be received by the linear CCD 37 is not reduced, so that a bright image can be obtained.

Furthermore, since the white LED 5 is used as the light source, it is not necessary to synchronize the timing of the image pickup with the timing of the light emission of the light source, unlike the prior art in which the fluorescent lamp is used. Thus, the image can be always picked up by the linear CCD 37 with a sufficient amount of light.

In addition, since the white LED 5 consumes less amount of electric power, the cost can be reduced.

Figure 10:
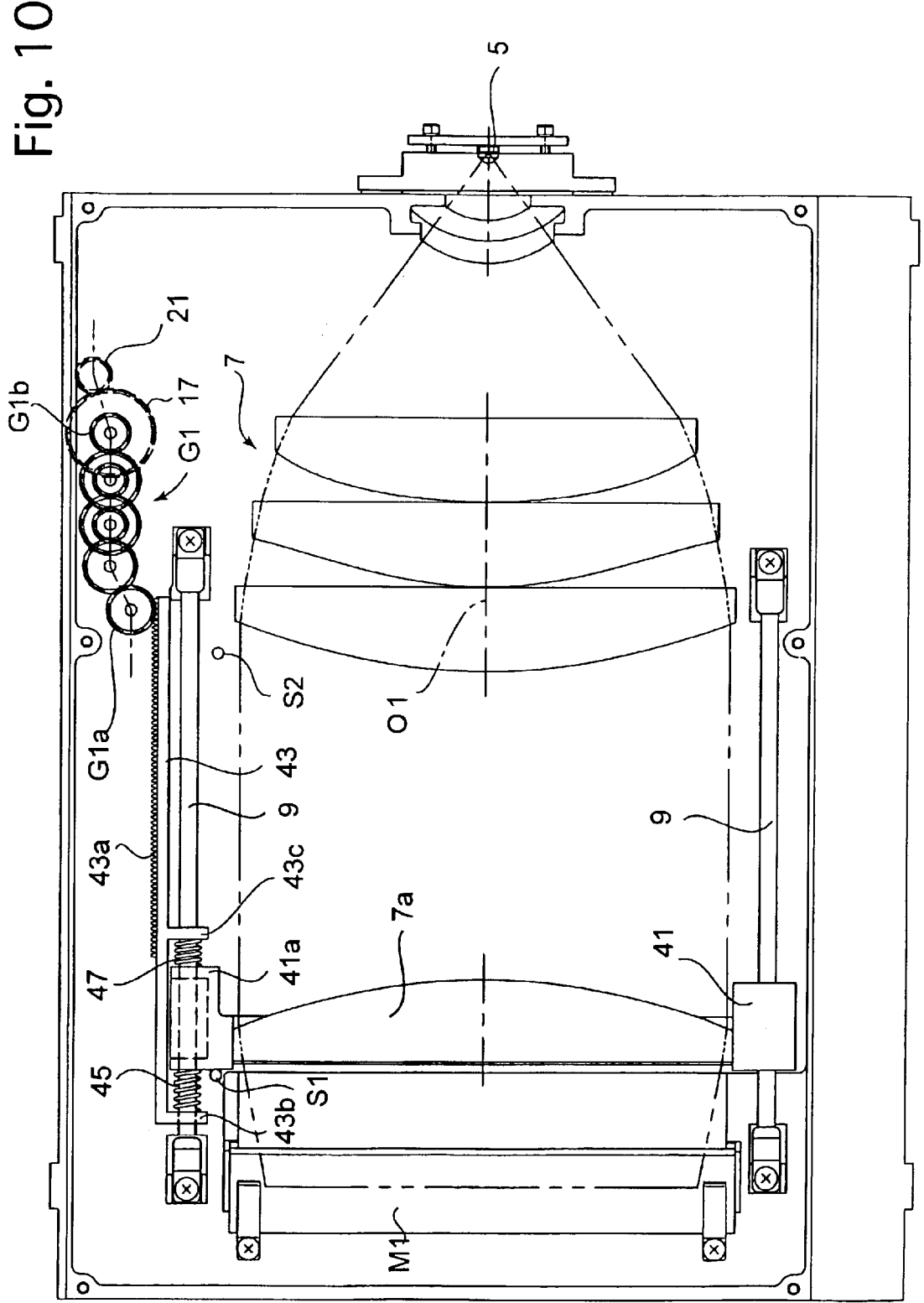
FIG. 10 is a plan view of an internal structure of a film scanner when a Brownie film is scanned, according to a second embodiment of the present invention.

A second embodiment of the present invention will be discussed with reference to FIGS. 10 and 11.

In the second embodiment, the elements corresponding to those in the first embodiment are designated with like reference numerals and no duplicate explanation will be given.

Instead of the lens holder 41 of the first embodiment having a rack 11a or 11b, a pressing member (driving body) 43, which is provided on the side surface thereof with a rack 43a, is provided attached to one of the guide rails 9 so as to move in the axial direction O3 along the guide rail 9. The pressing member 43 has a pair of receiving pieces 43b and 43c which are spaced in the direction of the optical axis O1. The receiving pieces 43b and 43c are provided with through holes (not shown) in which the guide rail 9 extends.

Compression springs 45 and 47 are provided between the contact portion 41a, which defines the side portion of the lens holder (driven body) 41, and the front and rear receiving pieces 43b and 43c, respectively. A pair of upright stoppers S1 and S2 are provided on the inner surface of the casing 3, so that the axial position of the lens holder 41 (movable lens 7a) can be determined by the contact portion 41a contacting the stopper S1 or S2.

The scanning operation of the film F1 or F2, using the film scanner 1 constructed as above, will be discussed below.

As in the first embodiment, the power switch is turned ON to energize the white LED 5 and the memory card is inserted in the memory card slot. When the Brownie film F1 is inserted in the casing 3 through the film insertion port, the film discrimination sensor detects that the inserted film is the Brownie film F1. As a result, the motor M is rotated in the forward direction in response to the forward rotation signal supplied from the CPU to the motor M. The rotation of the motor M is transmitted to the rack 43a of the pressing member 43 and the image pickup optical system holder 33 through the upper gear train G1 and the lower gear train G2, etc. Consequently, the pressing member 43 to which the rotation of the motor M has been transmitted is moved toward the stopper S1 along the guide rails 9, so that the compression spring 47 is biased by the receiving piece 43c toward the stopper S1, as shown in FIG. 10, and presses the lens holder 41 toward the stopper S1. The motor M continues rotating (overrunning) by a small amount even after the contact portion 41a of the lens holder 41 comes into contact with the stopper S1. The compression spring 47 is compressed by an amount corresponding to the overrun. Consequently, the lens holder 41 is brought into press-contact with the stopper S1 and is stopped at a correct stop position.

The first image pickup optical system 29 is moved to a light path between the mirror M2 and the linear CCD 37. An operation signal is supplied from the CPU to the film feeder, so that the Brownie film F1 is moved between the upper and lower mirrors M1 and M2 intermittently by a displacement corresponding to the line pitch of the linear CCD 37.

In this state, the image pickup can be carried out by the linear CCD 37, as in the first embodiment.

Figure 11:
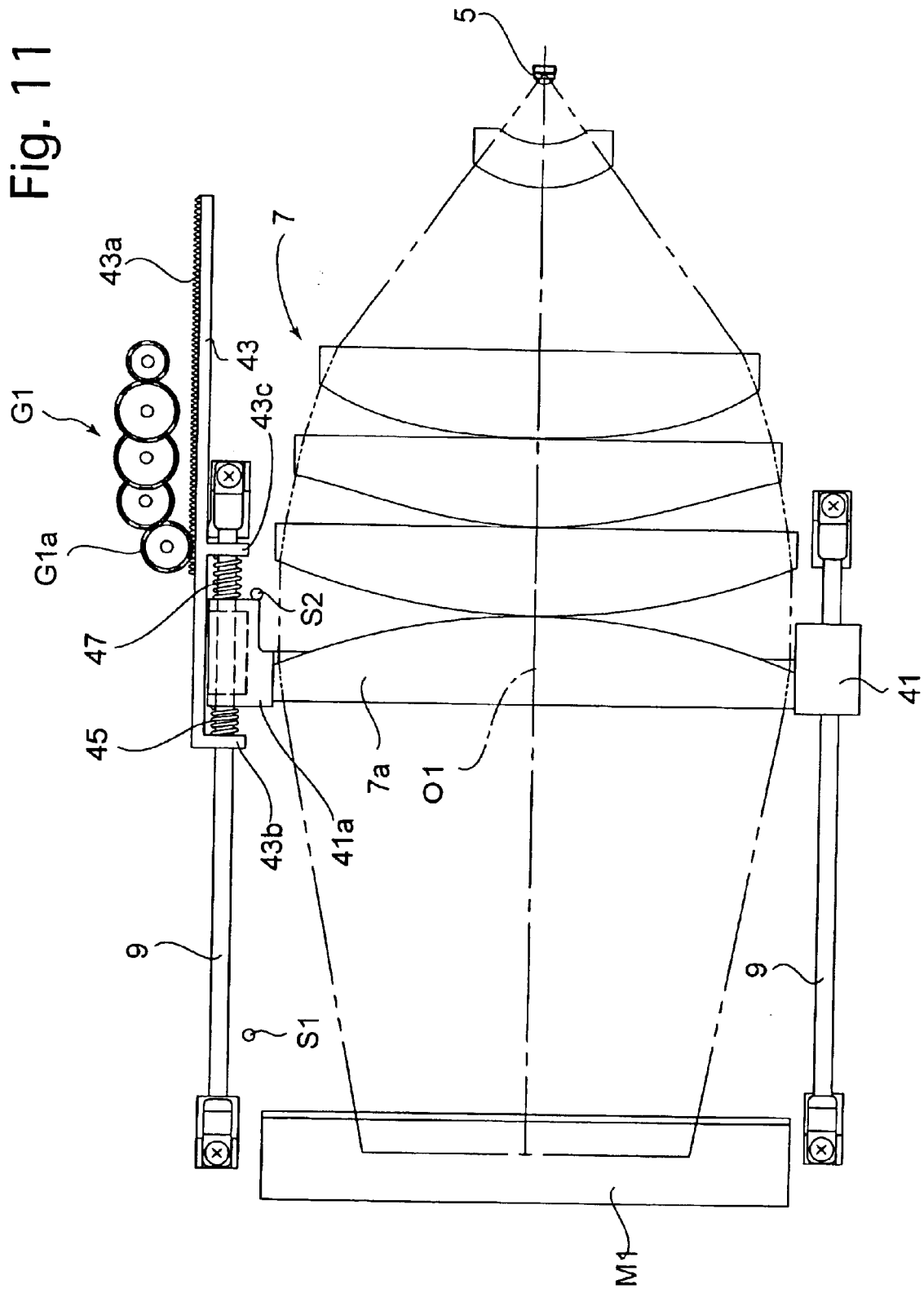
FIG. 11 is a plan view of an internal structure of a film scanner when a 35 mm film is scanned, according to a second embodiment of the present invention.

When a 35 mm film F2 is inserted in the film insertion opening, as shown in FIG. 11 (35 mm film is not shown therein), the film discrimination sensor detects that the inserted film is the 35 mm film F2. Consequently, the CPU sends a reverse rotation signal to the motor M, so that the motor M is rotated in the reverse direction. As a result, the lens holder 41 is moved away from the mirror M1 and the compression spring 45 which is biased by the receiving piece 43b toward the stopper S2 presses the lens holder 41 toward the stopper S2. The motor M continues rotating (overrunning) by a small amount even after the contact portion 41a of the lens holder 41 comes into contact with the stopper S2. The compression spring 45 is compressed by an amount corresponding to the overrun. Consequently, the lens holder 41 is brought into press-contact with the stopper S2 and is stopped at a correct stop position.

The reverse rotation of the motor M is transmitted to the rack 33a, so that the second image pickup optical system 31 is moved to a light path between the mirror M2 and the linear CCD 37 and the first image pickup optical system 29 is moved out of the light path. An operation signal is supplied from the CPU to the film feeder, so that the 35 mm film F2 is moved between the upper and lower mirrors M1 and M2 intermittently by a displacement corresponding to the line pitch of the linear CCD 37. In this state, the image pickup is carried out by the linear CCD 37.

In the second embodiment, when the width of the beam of light transmitted through the illumination optical system 7 is varied by moving the movable lens 7a, the motor M is controlled to continue rotating by a small amount of rotation even after the lens holder 41 comes into contact with the stopper S1 or S2, and the lens holder 41 is brought into contact with the stopper S1 or S2 by the biasing force of the compression spring 45 or 47. Therefore, the lens holder 41 (movable lens 7a) can be positioned precisely at a predetermined stop position without precisely controlling the rotation of the motor M.

Although the width of the light bundle is varied by alternately moving the first and second image pickup optical systems 29 and 31 of the image pickup optical unit 27 into the light path in the first and second embodiments discussed above, it is possible to make the image pickup optical system of a single image pickup optical element having a movable lens, similar to the illumination optical system 7. In this alternative, the extremities of the movement of the movable lens is restricted by the positioning mechanism mentioned above.

The white LED 5 can be replaced with an RGB LED or any other LED.

According to the above description, a simple positioning mechanism and a film scanner employing the positioning mechanism, in which the moving body can be stopped correctly at a predetermined stop position without precisely controlling the operation of the drive source, can be obtained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A positioning mechanism comprising:
   a moving body configured to move by receiving a drive force supplied from a drive source;
   a stopper which defines a movement extremity of the moving body; and
   a biasing device configured to engage the moving body when the moving body is moved to a vicinity of the movement extremity, and upon engagement with the moving body, said biasing device is configured to convert the force from the moving body into a force to bias the moving body toward the stopper.

2. The positioning mechanism according to claim 1, wherein the biasing device comprises:
   a toothed cam configured to engage a rack provided on the moving body when the moving body is moved to the vicinity of a movement extremity of the moving body, said toothed cam rotatably supported at a predetermined position; and
   a biasing member in elastic contact with the toothed cam, said toothed cam biased by the biasing member to rotate in a direction so that the moving body abuts against the stopper when the moving body is moved to the vicinity of said movement extremity such that the toothed cam begins engaging the rack.

3. A positioning mechanism comprising:
   a driving body configured to move by receiving a drive force supplied from a drive source;
   a driven body configured to receive moving force from the driving body and moves in the same direction as the driving body;
   a stopper which defines a movement extremity of the driven body; and
   a biasing device configured to convert the moving force from the driving body after the driven body abuts against the stopper, into a force to bias the driven body toward the stopper to bias the driven body.

4. The positioning mechanism according to claim 3, wherein the biasing device comprises a compression spring provided between the driving body and the driven body and which is compressed when the driving body is moved to thereby transmit the movement of the driving body to the driven body.

5. A positioning mechanism for a film scanner having a light source, an illumination optical system configured to change a light bundle emitted from the light source to correspond to the size of a film and illuminates a surface of the film, and an image pickup optical system configured to change the light bundle transmitted through the film surface to correspond to an area of an image pickup element to be used wherein the light bundle is incident upon the image pickup element, said positioning mechanism comprising:
   a moving body configured to hold a movable lens which constitutes a portion of one of the illumination optical system and the image pickup optical system, said moving body configured to be moved by receiving a drive force supplied from a drive source along an optical axis direction of said one of the illumination optical system and the image pickup optical system;
   a stopper in contact with the moving body to define a movement extremity of the moving body; and
   a biasing device configured to engage with the moving body when the moving body is moved to a vicinity of the movement extremity, and upon engagement with the moving body, said biasing device is configured to convert the force from the moving body into a force to bias the moving body toward the stopper.

6. The positioning mechanism for a film scanner according to claim 5, wherein the biasing device comprises a toothed cam configured to engage a rack provided on the moving body when the moving body is moved to the vicinity of the movement extremity, and configured to is rotatably supported at a predetermined position; and a biasing member configured to is in elastic contact with the toothed cam, said toothed cam being biased by the biasing member to rotate in a direction to bring the moving body in contact with the stopper when the moving body is moved to the vicinity of the movement extremity such that the toothed cam begins engaging with the rack.

7. A positioning mechanism for a film scanner having a light source, an illumination optical system configured to change the width of light bundle emitted from the light source to correspond to the size of a film and illuminates a surface of the film, and an image pickup optical system configured to change the light bundle transmitted through the film surface to correspond to an area of an image pickup element to be used, wherein the light bundle is incident upon the image pickup element, said positioning mechanism comprising:
   a driving body configured to move by receiving a drive force supplied from a drive source, along an optical axis of one of the illumination optical system and the image pickup optical system;
   a driven body configured to receive the moving force from the driving body and moves in the same direction as the driving body, said driven body supporting a movable lens which constitutes a portion of said one of the illumination optical system and the image pickup optical system;
   a stopper which defines a movement extremity of the driven body; and
   a biasing device configured to convert the moving force from the driving body, after the driven body abuts against the stopper, into a force to bias the driven body toward the stopper to thereby bias the driven body.

8. The positioning mechanism for a film scanner according to claim 7, wherein the biasing device comprises a compression spring provided between the driving body and the driven body, and said spring configured to be compressed when the driving body is moved, to transmit the movement of the driving body to the driven body.

* * * * *